(No Model.)
H. M. DU BOIS.
TIRE FOR VEHICLE WHEELS.
No. 419,005. Patented Jan. 7, 1890.
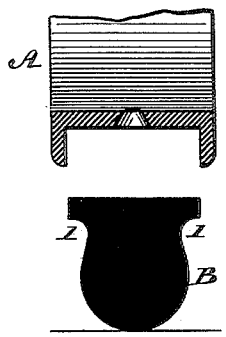
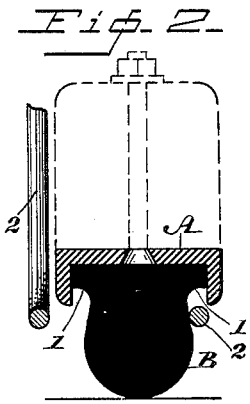
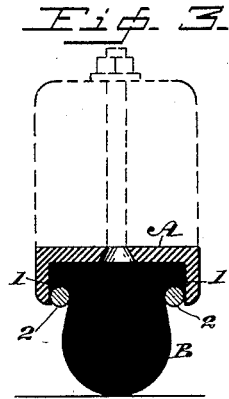
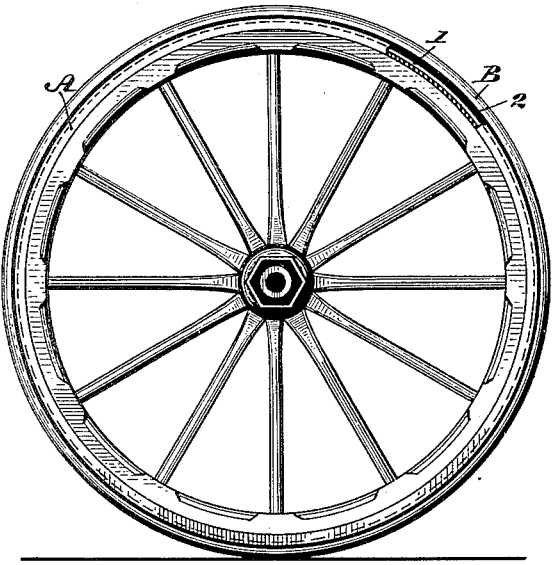
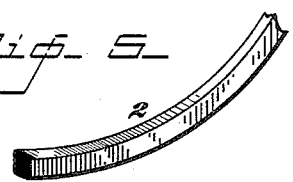
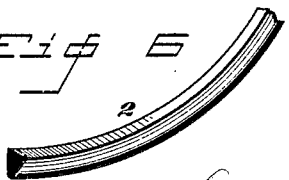
WITNESSES:
L. Douville,
A. P. Jennings.
INVENTOR:
Howard M. Du Bois.
BY Diedersheim + ——
ATTORNEYS.

UNITED STATES PATENT OFFICE.

HOWARD M. DU BOIS, OF PHILADELPHIA, PENNSYLVANIA.

TIRE FOR VEHICLE-WHEELS.

SPECIFICATION forming part of Letters Patent No. 419,005, dated January 7, 1890.

Application filed March 18, 1889. Serial No. 303,786. (No model.)

*To all whom it may concern:*

Be it known that I, HOWARD M. DU BOIS, a citizen of the United States, residing in the city and county of Philadelphia, State of Pennsylvania, have invented a new and useful Improvement in Tires for Vehicles, which improvement is fully set forth in the following specification and accompanying drawings.

My invention consists of a tire for a vehicle formed of a channeled tire and an elastic tread or rim fitted thereinto, the latter being secured to the former by annuli, which embrace said tread or rim and bind it firmly to the tire, as will be hereinafter set forth.

Figures 1, 2, and 3 represent sections of a tire embodying my invention. Fig. 4 represents a side elevation of a wheel having a tire embodying my invention. Figs. 5 and 6 represent perspective views of portions of modifications.

Similar letters and numerals of reference indicate corresponding parts in the several figures.

Referring to the drawings, A designates a channeled tire formed of suitable metal, and B designates a tread or rim, which is seated in said tire, and formed of soft rubber or other suitable elastic material. The sides of the rim near its inner periphery are formed with circumferential shoulders 1 1, which are circumscribed by rings, bands, or annuli 2, of metal, and tightly embraced by the same, whereby the rim is firmly connected with the tire in the peripheral direction thereof, it being seen that the shoulders 1 and annuli 2 are within the outer periphery of the tire, so that lateral displacement of said parts 1 and 2 is prevented.

In practice each annulus is primarily of greater diameter than that of the tire, so that it may be readily fitted over the tire against the tread, after which it is upset, so as to reduce its diameter, and thus embrace or compress the inner portion of the tread about the respective shoulder 1 and bind the same tightly to the tread.

The shape of the annuli in cross-section may be varied, the forms of which may be as shown in Figs. 5 and 6, as well as in Fig. 2.

I am aware that it is old to secure a tread within a tire by means of wires passed circumferentially around the said tread; but I am not aware that it is common to secure the tread by upsetting an annulus thereon, as herein described and claimed.

Having thus described my invention, what I claim as new, and desire to secure by Letters Patent, is—

1. A vehicle-wheel having a tire with side flanges, a tread having shoulders thereon, and an upset annulus surrounding said tread and within said tire, said parts being combined substantially as described.

2. A rim and a tire, in combination with an upset ring which engages with the rim and binds it to the tire, substantially as described.

HOWARD M. DU BOIS.

Witnesses:
JOHN A. WIEDERSHEIM,
JAMES F. KELLY.